United States Patent
Imes et al.

(10) Patent No.: US 7,283,754 B2
(45) Date of Patent: Oct. 16, 2007

(54) ONE TOUCH SUPPLY ORDERING METHOD

(75) Inventors: Edward P. Imes, Ontario, NY (US);
Liam S. Cummings, Macedon, NY (US); Catherine N. Byers, Walworth, NY (US); Timothy S. Claremont, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/648,413

(22) Filed: Aug. 26, 2003

(65) Prior Publication Data

US 2005/0047803 A1 Mar. 3, 2005

(51) Int. Cl.
*G03G 15/00* (2006.01)
(52) U.S. Cl. .............................. 399/8; 399/24
(58) Field of Classification Search .................... 399/8, 399/10, 24, 79, 9, 11
See application file for complete search history.

(56) References Cited

U.S. PATENT DOCUMENTS

| | | | |
|---|---|---|---|
| 5,636,032 A * | 6/1997 | Springett | 358/296 |
| 6,302,527 B1 | 10/2001 | Walker | |
| 6,312,106 B1 | 11/2001 | Walker | |
| 6,333,790 B1 | 12/2001 | Kageyama | |
| 6,798,995 B2 | 9/2004 | Nagata | |
| 6,798,997 B1 | 9/2004 | Hayward et al. | |
| 2002/0076225 A1* | 6/2002 | Kurz et al. | 399/12 |

* cited by examiner

*Primary Examiner*—Quana Grainger
(74) *Attorney, Agent, or Firm*—Maginot, Moore & Beck

(57) ABSTRACT

A method of ordering replacement items used by a reproduction device at least includes: providing coupled to said reproduction device, a replacement item information button; and in response to a user activating said replacement item button, producing via said reproduction device, at least one replacement item information document; wherein said replacement item information comprises specific information needed to facilitate the ordering of the exact replacement items which are used by said reproduction device.

12 Claims, 4 Drawing Sheets

ONE TOUCH SUPPLY ORDERING METHOD

FIELD OF THE INVENTION

The present invention broadly relates to physical document reproduction devices such copiers, printers, facsimile machines, and the like. More particularly, the present invention relates to the ordering and reordering of specific supplies and parts periodically needed to keep reproduction devices functioning.

BACKGROUND OF RELATED ART

It is well-understood that reproduction devices such as copying machines (or "copiers"), computer printers (or "printers"), facsimile machines (or "fax machines"), and combination devices (e.g., "all-in-one machines") periodically require replacement of consumable items such as toner and printing ink. It is also possible that a user may need to replace actual parts of the reproduction devices sometimes.

It is also well-understood that even among the same category of reproduction devices, such as copiers for example, there may be dozens, if not over one hundred different models being currently sold by the same company. For various reasons, replacement consumable items such as toner cartridges can be nearly as diverse as the copiers, with often little compatibility of a particular toner cartridge with more than one copier. For this reason, it is imperative when repurchasing or reordering consumable items for reproduction devices that the exact supply item number, part number or other identifier is given to the re-supplying merchant, so that the correct and compatible consumable item is received.

The usual clumsy prior art approach is to have users rely on a printed manual supplied at the time of the initial purchase of the reproduction device. Often, however, these manuals are lost. Further, even when they are not lost, because the manuals must often cover a large number of topics and information, they may be bulky, and intimidating for more technologically-challenged users.

Another approach is to remove the replacement item, which can be bulky and sometimes soils its surroundings, and take it to a re-supplying merchant to have it matched. This is not possible when placing online or telephone reorders of the replacement item. The user is then left with perhaps having to jot down what might be several numbers listed on the item to be replaced, in the hope that he or she will have written down a number of use.

What is therefore needed, is a way to immediately provide replacement item information to a reproduction device user on the user's demand, and in a user-friendly way for easy and accurate replacement item reordering. There is also an unmet need to provide a more efficient way for remotely ordering replacement items for reproduction devices.

SUMMARY

In view of the above-identified problems and limitations of the prior art, the present invention provides a method of ordering replacement items used by a reproduction device, at least including providing coupled to the reproduction device, a replacement item information button, and in response to a user activating the replacement item button, producing via the reproduction device, at least one replacement item information document. The replacement item information at least includes specific information needed to facilitate the ordering of the exact replacement items which are used by the reproduction device.

The present invention also provides a method of ordering replacement items used by a reproduction device, at least including networking at least one reproduction device to a computer, providing via a display coupled to the computer, a replacement item information icon, allowing a user to select a networked reproduction device for ordering at least one replacement item, and in response to a user activating the replacement item icon, transmitting at least one replacement item information document from a reproduction device to the computer. Again, the replacement item information at least includes specific information needed to facilitate the ordering of the exact replacement items which are used by the reproduction device.

The present invention is not strictly limited to reproduction devices, and is also compatible with other devices where consumable items are expected to be replaced before the end of the device's useful life.

BRIEF DESCRIPTION OF THE DRAWINGS

Features of the present invention will become apparent to those skilled in the art from the following description with reference to the drawings, in which.

DETAILED DESCRIPTION

Figure 1:
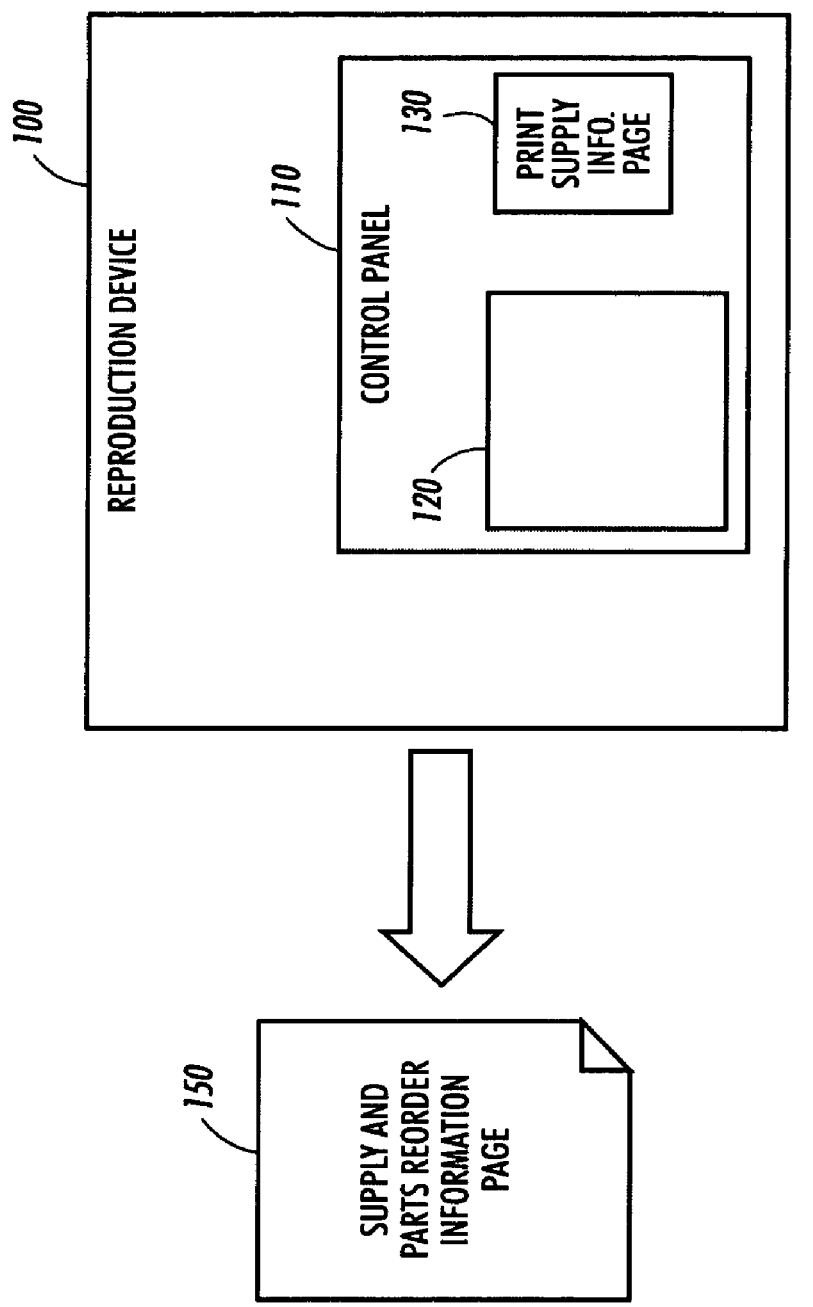
FIG. 1 illustrates a reproduction device utilizing the present-inventive on-demand, one-touch replacement item information page generation scheme.

A novel reproduction device (e.g., printer, copying machine, fax, etc.) 100 is shown in FIG. 1, and incorporates the on-demand, one-touch replacement item information generation feature of the present invention. Mounted on the reproduction device 100 is a control panel 110 containing a typical keypad or other data entry area 120. Not typical, however, is a separate key or replacement item button 130 with a label such as "PRINT SUPPLY INFORMATION PAGE."

In immediate response to the button 130 being pressed or activated, the reproduction device prints an information page 150 detailing the part numbers and other information for all of the items which may need to be periodically replaced (e.g., toner cartridges, ink jet and bubble jet cartridges, fax cartridges). The Supply and Parts Reorder Information Page 150 can then be conveniently used to reorder the correct replacement item for the reproduction device 100.

In an alternate embodiment, the information page 150 is displayed on a display either integrated with the reproduction device 100 or connected to the reproduction device—either directly, or via a computer.

Figure 3:
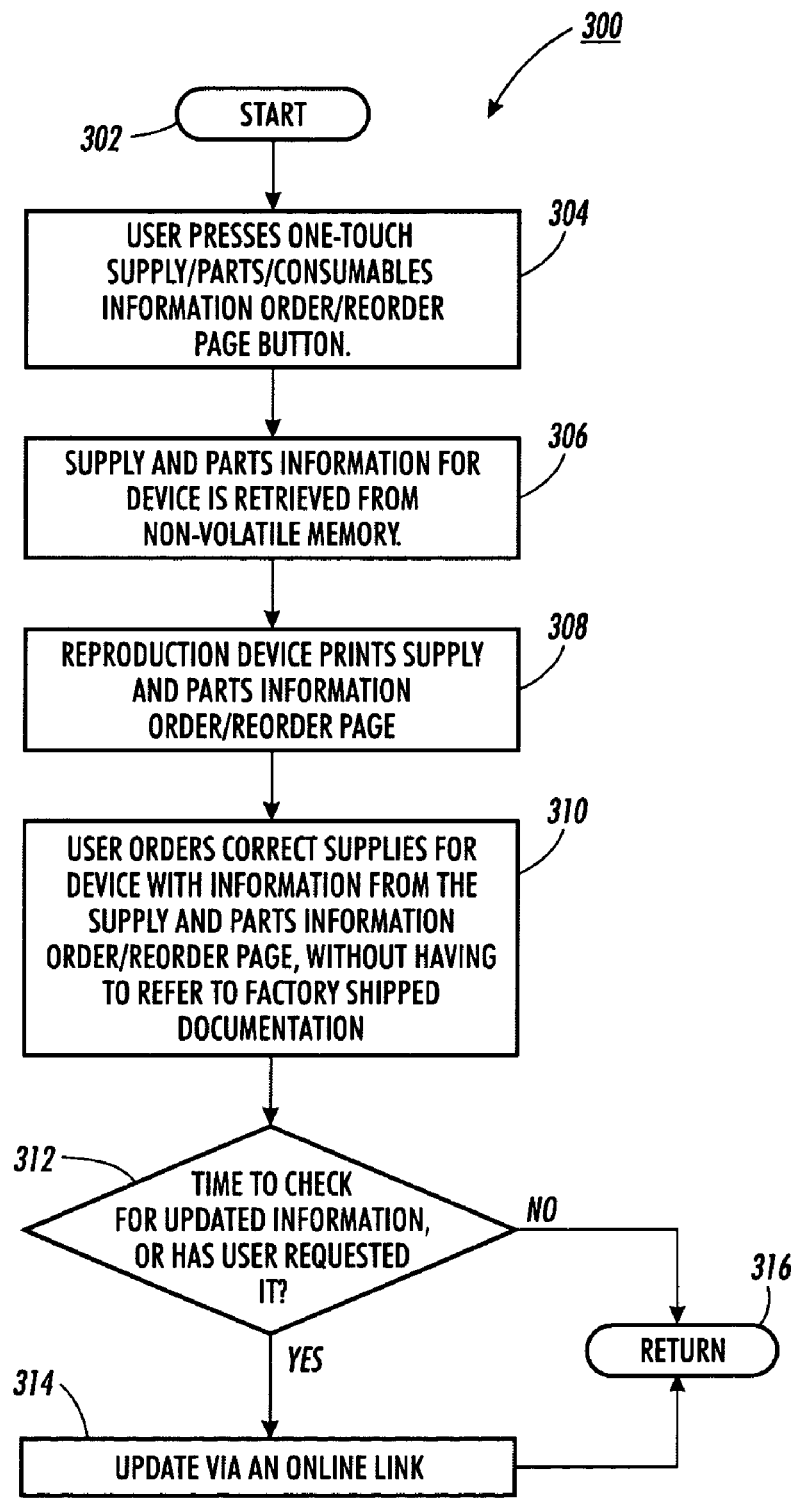
FIG. 3 is a flowchart detailing the steps in the present-inventive on-demand, one-touch replacement item information page generation and ordering methods.

The process is illustrated in the program/algorithm 300 of FIG. 3. After the start 302 of the program, the user activates the rest of the program by pressing the on-demand, one-touch supply/parts/consumables information order/reorder button 130 in Step 304. In response, the control of the reproduction device 100 retrieves the replacement item information from the device's non-volatile memory in Step 306. The reproduction device 100 conveniently prints or displays the supply and parts reorder information in Step 308.

The user can then order the correct replacement item without having to refer to factory-shipped documentation in Step 310.

Those skilled in the art will appreciate that the original replacement item information stored in memory may not include the item numbers of newer compatible items that were not in existence or not included at the time the reproduction device was shipped to the customer. Consequently, the program 300 includes Steps 312 and 314. If either the user requests that there be a check for updated information, or if the reproduction device indicates that it is time to check for updates, the user may connect to a website via the Internet and download the update information to a computer, and then to the connected reproduction device, where the reproduction device does not have Internet access capability. The program stops in Step 316.

Figure 2:
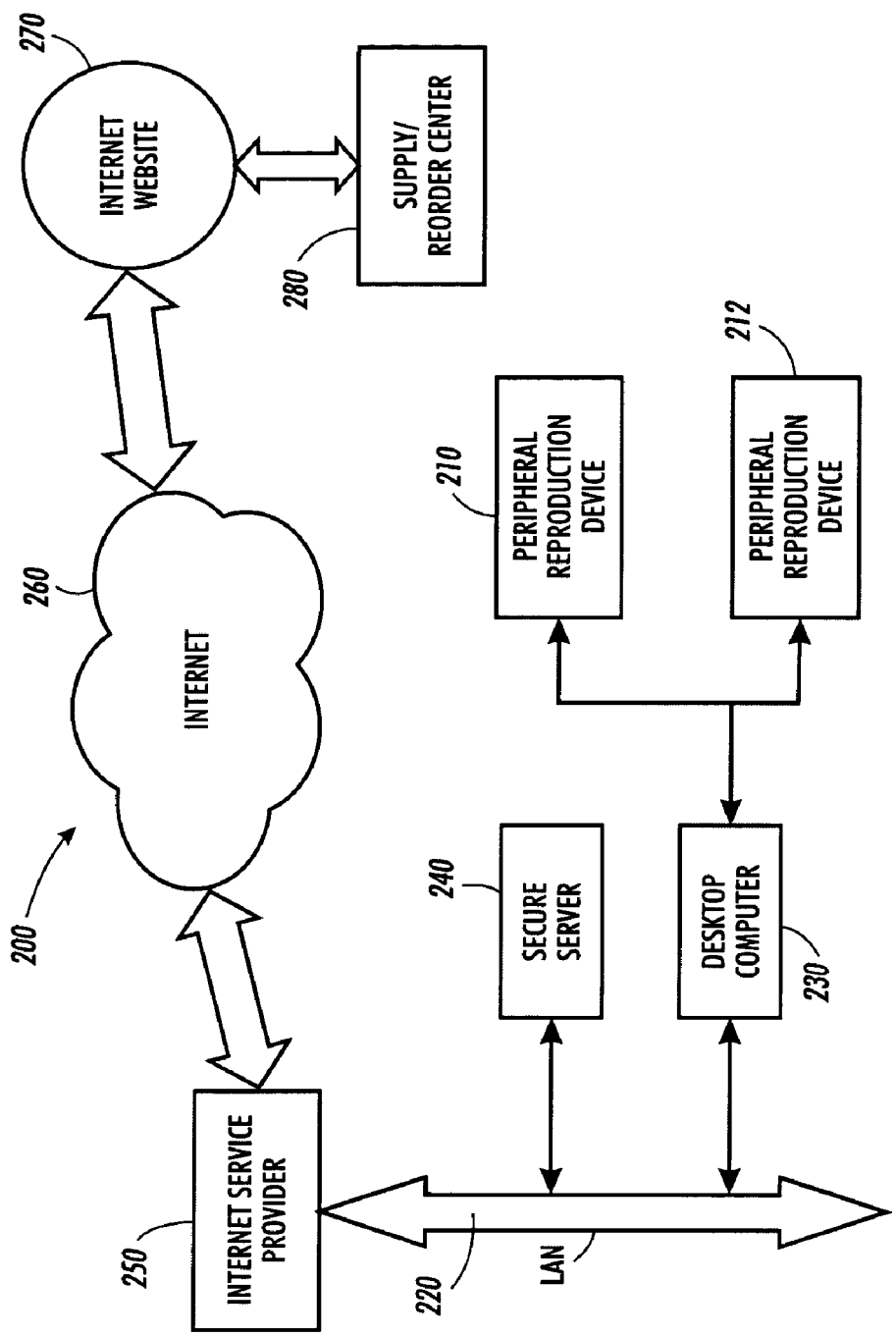
FIG. 2 is a schematic diagram for a system utilizing the present-inventive remote ordering scheme for replacement items used by reproduction devices.

FIG. 2 is a schematic diagram of an improved system 200 for ordering replacement items. Several peripheral reproduction devices 210, 212, are networked to a desktop computer 230. Those skilled in the art will appreciate that other elements such as a Local Area Network (LAN) 220 and a secure server 240 can be included in the system 200.

When a peripheral device is in need of a replacement item, the user can query the peripheral device via the computer 230 for the correct replacement information. The user can connect to an Internet website 270 maintained by a merchant or supplier 280 by way of the Internet 260 and an Internet Service Provider (ISP) 250. The order including the specific replacement item information can be interactively placed. Thus has been disclosed a system for the efficient and accurate ordering of replacement items for reproduction devices via the Internet. This approach will also work with Intranets, and direct telephone connections between the user's computer 230 and the supply/reorder center 280.

Figure 4:
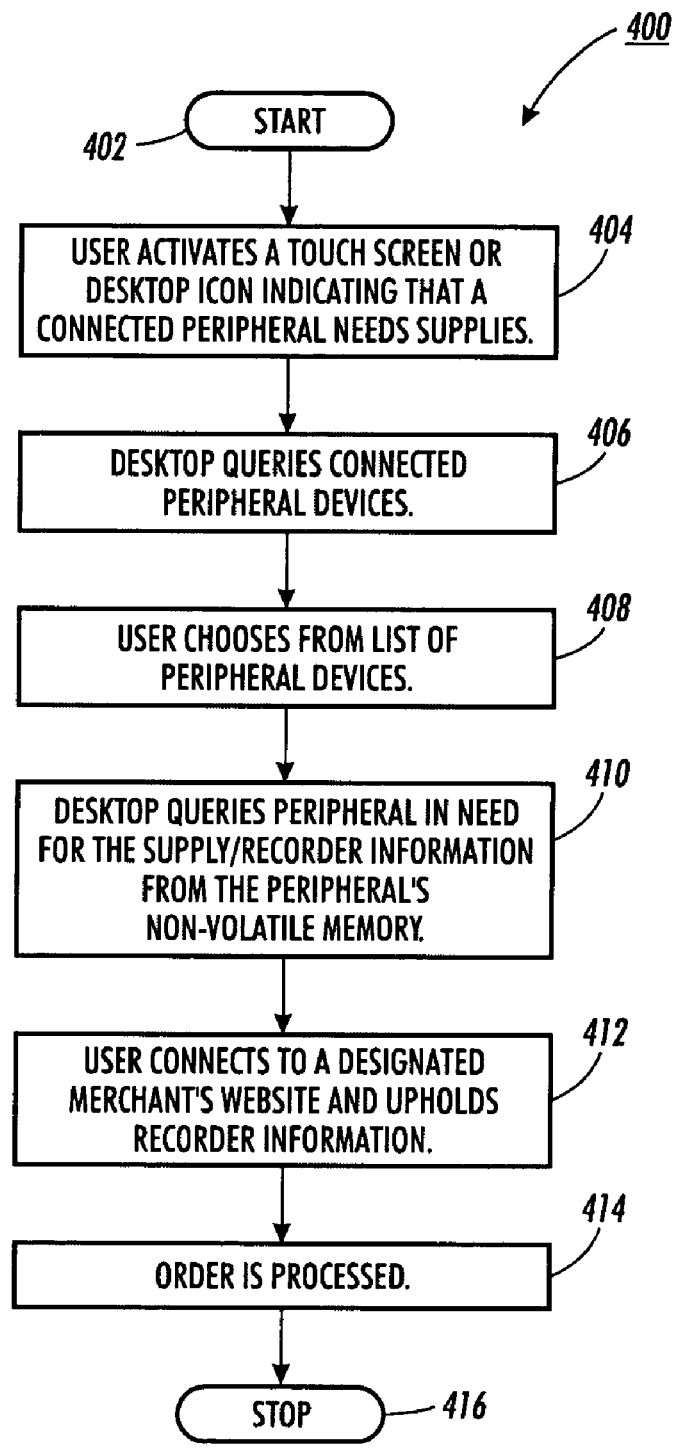
FIG. 4 is a flowchart detailing the steps in the present-inventive remote ordering method.

The general program 400 carrying out the steps for online replacement item ordering is detailed in FIG. 4.

After the Start (Step 402) of the program 400, the user activates a desktop screen icon indicating that a connected peripheral needs a replacement item (Step 404). This may be in response to the peripheral sending a message to the desktop computer that supplies are needed (or are low). The desktop computer 230 queries the peripheral devices and chooses the one or ones needing replacement items (Steps 406 and 408). If the replacement item information is not already stored on the desktop computer, the computer queries the particular peripheral's non-volatile memory for the needed replacement item information (Step 410).

In Step 412, the user connects to a designated merchant or supplier's website 270 and orders the replacement item or items that are appropriate for the peripheral device. The order is processed in Step 414, followed by the end of the program (Step 416).

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of ordering replacement items used by a reproduction device comprising:
   providing a replacement item information button coupled to said reproduction device;
   activating said replacement item button;
   producing via said reproduction device at least one replacement item information document in response to activation of said replacement item button; and
   reproducing specific information needed to facilitate the ordering of a replacement item which is used by said reproduction device from said replacement information document in the form of a hard copy.

2. The method of claim 1, further comprising:
   reproducing said replacement information document in the form of a user-perceivable display coupled to said reproduction device.

3. The method of claim 1, wherein said replacement item comprises supplies consumable by said reproduction device.

4. The method of claim 1, wherein said replacement item comprises a replacement part compatible with said reproduction device.

5. The method of claim 1, wherein said supplies comprise toner.

6. The method of claim 1, wherein said supplies comprise printing ink.

7. The method of claim 1, wherein said reproduction device is a copying machine.

8. The method of claim 1, wherein said reproduction device is a printer.

9. The method of claim 1, wherein said reproduction device is a facsimile machine.

10. The method of claim 1, further comprising:
    storing said replacement item information in non-volatile memory.

11. The method of claim 1, further comprising:
    updating said replacement item information via coupling to a wide area networked website under the dominion of a designated merchant.

12. The method of claim 1, further comprising:
    ordering replacement items via an electronic coupling to an instrumentality under the dominion of a designated merchant.

* * * * *